United States Patent [19]

Chen et al.

[11] Patent Number: 5,754,309
[45] Date of Patent: May 19, 1998

[54] TONE CORRECTION FOR MULTI-LEVEL HALFTONED IMAGES

[75] Inventors: Kok S. Chen, Sunnyvale; Magnus L. Karlsson, Milpitas, both of Calif.

[73] Assignee: Apple Computer, Inc., Cupertino, Calif.

[21] Appl. No.: 471,657

[22] Filed: Jun. 6, 1995

[51] Int. Cl.$^6$ .................. H04N 1/40; H04N 1/41; H04N 1/21; H04N 1/46

[52] U.S. Cl. .................. 358/456; 358/429; 358/298; 358/455; 358/460; 358/534; 358/532; 358/536; 345/199; 345/201

[58] Field of Search ................. 358/456, 429, 358/298, 455, 457, 458, 460, 532, 533, 534, 535, 536; 382/274, 268; 345/199, 201; 347/240, 251, 252, 253, 254

[56] References Cited

U.S. PATENT DOCUMENTS

| | | | |
|---|---|---|---|
| 4,695,884 | 9/1987 | Anastassiou et al. | 382/169 |
| 4,816,863 | 3/1989 | Lee | 358/300 |
| 4,835,551 | 5/1989 | Ng | 358/296 |
| 5,291,311 | 3/1994 | Miller | 358/456 |
| 5,321,523 | 6/1994 | Hashimoto | 358/455 |
| 5,337,167 | 8/1994 | Hiratsuka et al. | 358/456 |
| 5,339,171 | 8/1994 | Fujisawa et al. | 358/456 |

OTHER PUBLICATIONS

Adobe Systems Incorporated, "Postscript Language Reference Manual", 2nd Edition, 1990, pp. 307–309, 293–294.

*Primary Examiner*—Kim Vu
*Assistant Examiner*—Tia M. Harris
*Attorney, Agent, or Firm*—Burns, Doane, Swecker & Mathis

[57] ABSTRACT

A multi-level image output device performs correction of pixel values which have undergone halftone processing to compensate for non-linearities. This correction is carried out by means of a tonal reproduction transfer function, which linearizes the output values from a halftone processor before they are applied to an image generator, such as a laser modulator. By rectifying non-linear intensity of individual pixels, images can be generated with a smoother grayscale gradient. The function of the post-halftone correction can be combined with a modulator, to achieve an economy of components which make up the output device. As a further feature, a plurality of post-halftoning correction devices can be provided. One of these devices is selected to correct the data values produced by halftone processing, in dependence upon the values of neighboring pixels in an image.

20 Claims, 5 Drawing Sheets

TONE CORRECTION FOR MULTI-LEVEL HALFTONED IMAGES

FIELD OF THE INVENTION

The present invention is directed to the field of image reproduction, and more particularly to halftone processing of image data for output devices that are capable of producing multiple levels of intensity for each element of the image.

BACKGROUND OF THE INVENTION

To reproduce an image on a device such as a display monitor or a printer, image values are measured at fixed spatial coordinates and stored within a memory. Basically, the image values represent the amount of saturation, or intensity, of one or more component colors at each sampled point. In a grayscale image, the image value indicates the percentage of black at the sampled point. In a color image, the image value identifies the percentage of each of the component colors that comprise a color space for the output device. For example, in a computer monitor which operates within a red-green-blue (RGB) color space, the image value indicates the percentage of each of the red, green and blue components at each sampled point. Typically, the sampling is performed at equidistant points on a rectangular grid. Each sample point is referred to as a picture element, commonly known as a pixel.

A continuous-toned image is one in which the pixels can take on an infinite number of image values. Some imaging devices are capable of reproducing an image with a continuous, or almost continuous, spectrum of colors, and are referred to as "contone" devices. Examples of such devices include photographic systems and television. Other types of imaging devices are not able to reproduce image values over a continuous, or almost continuous, range. For example, many types of printers operate as bilevel devices. A bilevel device is one in which the image value for each pixel can only exist in one of two states for each color. For example, in a single-color printer, each pixel is either black or white. In a bilevel color printer, each of the component colors which make up the color space of the printer can only be produced at a 100% saturation level within each pixel. Intermediate tones, such as varying shades of gray, cannot be directly generated for each pixel in the image.

To overcome the tonal reproduction limitations associated with bilevel devices, a process known as halftoning is employed. Generally speaking, halftoning is a process by which continuous-tone image values are approximated by a pattern of pixels, each of which can be individually represented with only a limited number of values. A familiar case of this process is the rendering of gray tones with black and white pixels, as in a newspaper photograph. Various halftoning processes, such as thresholding, error diffusion, dithering and halftone screening, are well known in the art. Basically, in a halftone process, a region of pixels identified as a halftone cell is defined. The cell contains a specific, repeatable pattern, and the number of pixels in the cell determines the tonal range of the halftone pattern. In a simple example, a halftone cell may comprise a two-by-two matrix of pixels. Using such a cell, five different intensities, or shades, of a color can be represented. For example, white, black and three intermediate levels of gray can be produced. To produce the color white, all four of the pixels in the cell are displayed as white, e.g. no ink is placed in any pixel. Conversely, to represent black, all four of the pixels in a cell are displayed as black. To represent the intermediate levels of gray, one, two or three of the pixels in the cell are assigned the black image value, and the remaining pixels in the cell are assigned the white value. By repeating this cell pattern throughout an area of interest, the resulting image appears to have a tone which represents a desired grayscale value.

The tonal characteristics of physical devices typically are not linear. For example, in a cathode ray tube display of the type used in computer monitors, the intensity of a color follows a power law with respect to the electron beam current of the cathode ray tube. The value of the power usually falls within the range of 1.5 to 3.0, and is labeled "gamma". Correction that is made to the electron beam current to yield linear pixel intensities is known as gamma correction. Devices for performing this type of correction operate on an inverse-power law. For example, they may employ a look-up table which corrects pixel values before they reach the modulator of the electron beam.

Another example of a device which does not produce a linear intensity relationship for halftoned images is a bilevel printer. Typically, printers do not create pixels of the ideal size and shape which permit a halftoning process to create output gray values whose intensities vary linearly with input contone values. Rather, the observed saturation may be suppressed at the lower end of the contone range, and increased at the upper end of the contone range.

To compensate for this phenomenon, bilevel image output devices, such as laser printers, employ tonal correction. In operation, a tonal reproduction curve (TRC) is utilized to correct contone image values before they undergo halftone processing. The tonal reproduction curve essentially comprises a transfer function having a non-linearity which is the inverse of that of the halftone process. By applying the TRC transfer function to the image data, the resulting halftone process produces a color intensity over the area of the halftone cell which appears to be linear throughout the tonal spectrum.

Recently, more advanced printers and other types of display devices are capable of generating multi-level intensities for individual pixels of images. In these types of devices, an individual pixel can be represented by more than two values. For example, printers which are capable of reproducing 4–16 levels of gray per pixel are known. In a similar manner, liquid crystal display (LCD) panels can produce images in which each pixel element is represented at one of multiple levels. While offering much greater capabilities than bilevel devices, these multi-level devices are still only able to reproduce a limited number of grayscale levels. To produce images and graphics with a sufficient range of tonal representation, halftone processing is still desirable. One example of halftone processing for multi-level image data is disclosed in copending, commonly assigned application Ser. No. 08/397,601, filed Mar. 2, 1995 by Kok S. Chen and Magnus L. Karlsson, the disclosure of which is incorporated herein by reference.

When halftoning is employed in the context of a multi-level image output device, a further type of non-linearity appears. More particularly, even if the overall non-linearity associated with the halftoning process is corrected by means of a TRC transfer function, a "rippling" effect is observed in the grayscale intensities of images produced by multi-level devices. This effect is due to non-linearities of the intensities that are generated over the multiple levels within the individual pixels of a halftone cell. These non-linearities are a function of the particular marking device, e.g. print engine, that actually generates the images on the paper, and can vary from one device to another.

It is desirable, therefore, to provide an improved halftoning process for multi-level image output devices, which provides a greater linearity of appearance over a range of grayscale values.

SUMMARY OF THE INVENTION

In accordance with the present invention, this objective is achieved in a multi-level image output device by tonal correction of pixel values which have undergone halftone processing. This correction is carried out by means of a pixel-level transfer function, which linearizes the output values from a halftone processor before they are applied to an image generator, such as a laser modulator. By rectifying non-linear intensity of individual pixels, images can be generated with a smoother grayscale gradient.

In a second aspect of the invention, the function of the post-halftone pixel-level correction can be combined with a modulator, to achieve an improvement in economy of components which make up the output device. As a further feature of the invention, a plurality of post-halftoning correction devices can be provided. One of these devices is selected to correct the data values produced by halftone processing, in dependence upon the values of neighboring pixels in an image. With this added feature, the output quality of an image is further improved.

In a preferred embodiment of the invention, both of the additional features are combined, such that the functions of multiple post-halftone pixel-level correctors are integrated with multiple modulators, to provide improved output image quality without unduly increasing the number of components, and hence the cost, of the output device.

Further features of the invention, and the advantages attained thereby, are explained in detail hereinafter with reference to the embodiments illustrated in the accompanying drawings.

DETAILED DESCRIPTION

To facilitate an understanding of the present invention, it is described hereinafter with reference to its implementation in a laser printer. Further in this regard, the principles of the invention are described with reference to a monochromatic, e.g. black and white, printer, to avoid unduly complicating the discussion. However, it will be appreciated that the practical applications of the invention are not limited to this disclosed embodiment. Rather, the principles of the invention are applicable to any type of multi-level image output device in which it is desirable to employ halftone image processing, including color devices.

Figure 1:
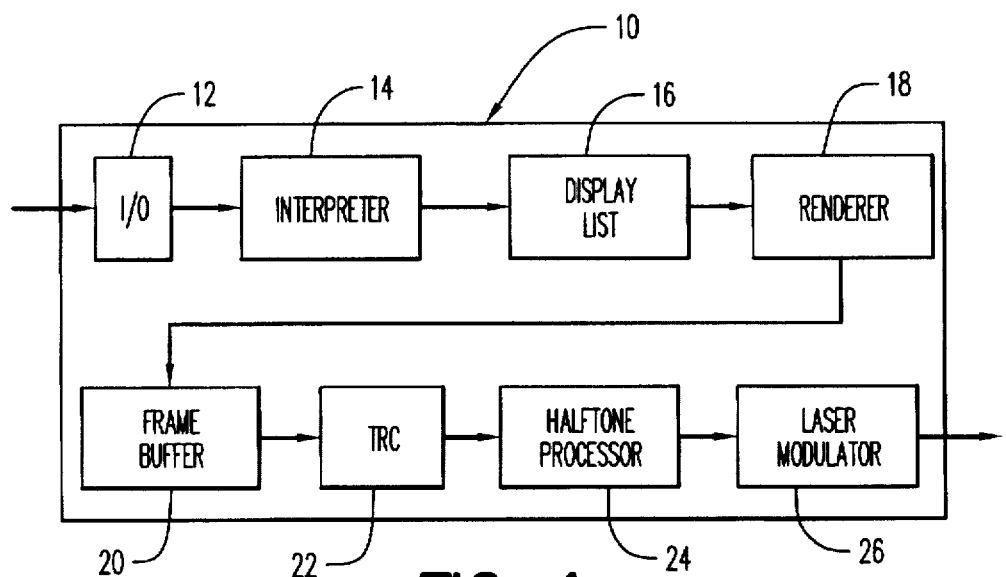
FIG. 1 is a general block diagram of the major subsystems of a laser printer.

Referring to FIG. 1, the major subsystems of a laser printer, of the type in which the present invention might be employed, are illustrated in block diagram form. Referring thereto, the printer 10 includes an I/O controller 12 that is connected to one or more I/O ports for communication with computers and other external sources of data to be printed. An interpreter 14 receives a stream of image data and issues calls which cause the desired image to be drawn, or printed, on the paper. These calls can be of two basic types. One set of calls describes the objects to be drawn, such as a rectangle, a particular character of text, or the like. The other set of calls identifies the appearance states of the objects, such as patterns or shading within an object. In the illustrated embodiment of the printer, these calls are stored in an intermediate form, known as a display list 16, or a metafile.

The information on the display list is provided to a renderer 18. The renderer converts the object-based information from the interpreter 14 into individual pixel display values, which are stored in a frame buffer 20. These values are stored as contone, or pseudo-contone, values. For example, if the printer is configured to generate 256 levels of gray, each display value might be stored in the frame buffer as an 8-bit value. The individual pixel values stored in the frame buffer 20 are processed in a tonal reproduction corrector 22. The corrector 22 produces contone image values, which are applied to a halftone processor 24. For example, these contone image values could also be 8-bit values. Pixel display values generated by the halftone processor are applied to a laser modulator 26, which causes a scanned laser beam to strike a photosensitive surface at designated pixel locations and with a designated intensity. The format of the pixel display values produced by the halftone processor 24 corresponds to the capabilities of the print engine in which the laser is incorporated. For example, if the print engine is capable of generating 16 levels of gray per pixel, the halftone processor can generate 4-bit output values. If the print engine is only capable of producing four levels of gray per pixel, the halftone processor 24 need only generate 2-bit output values.

The tonal reproduction corrector 22 is typically implemented in the form of a look-up table. This look-up table contains values which correspond to a transfer function having a non-linearity which is the inverse of that which is inherent to the halftone processor 24. For example, with reference to FIG. 2, the halftone processing of the pixels might produce a non-linearity as depicted by the solid line 28. This non-linearity represents the deviation between a specified contone value and the actual intensity, or grayscale value, in a halftone cell of the image. As can be seen, for input values at the lower end of the contone range, the actual grayscale value has less saturation than that specified by the input value, whereas at the upper end of the input range the printed grayscale value is greater than that required by the input value. To compensate for this effect, the tonal reproduction corrector 22 has a transfer function of the type depicted by the narrow line 30. The effect of the tonal reproduction corrector is to compensate for the non-linearity of the halftone processor. When the compensation of the tonal reproduction corrector is added to the non-linearity of the halftone processor, the resulting output values exhibit the desired linearity, as depicted by the dashed line 32. For more detailed information regarding tonal reproduction curves and their use in output devices, reference is made to the *PostScript Language Reference Manual*, 2nd Ed., Adobe Systems, Inc., Addison-Wesley 1990, ISBN, 0-201-18127-4.

Figure 2:
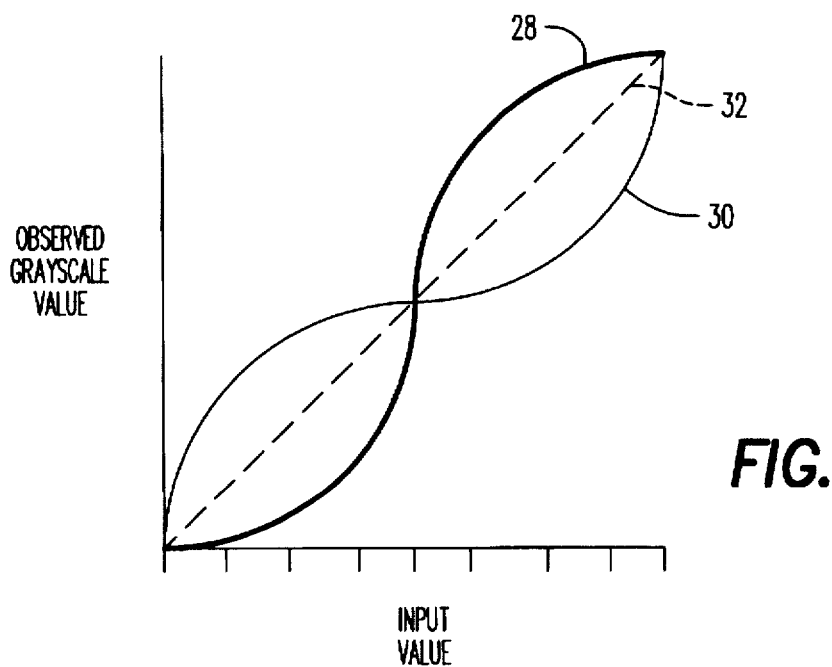
FIG. 2 is a graph illustrating the non-linearity associated with a halftoning process and the transfer function of a tonal reproduction curve.
Figure 3A:
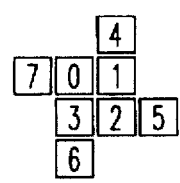
FIGS. 3A and 3B are illustrations of a halftoning screen and its application to an image area, respectively.
Figure 3B:
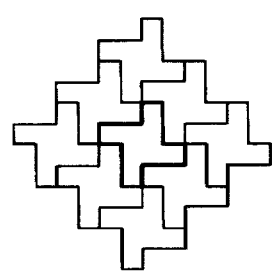
Figure 4:
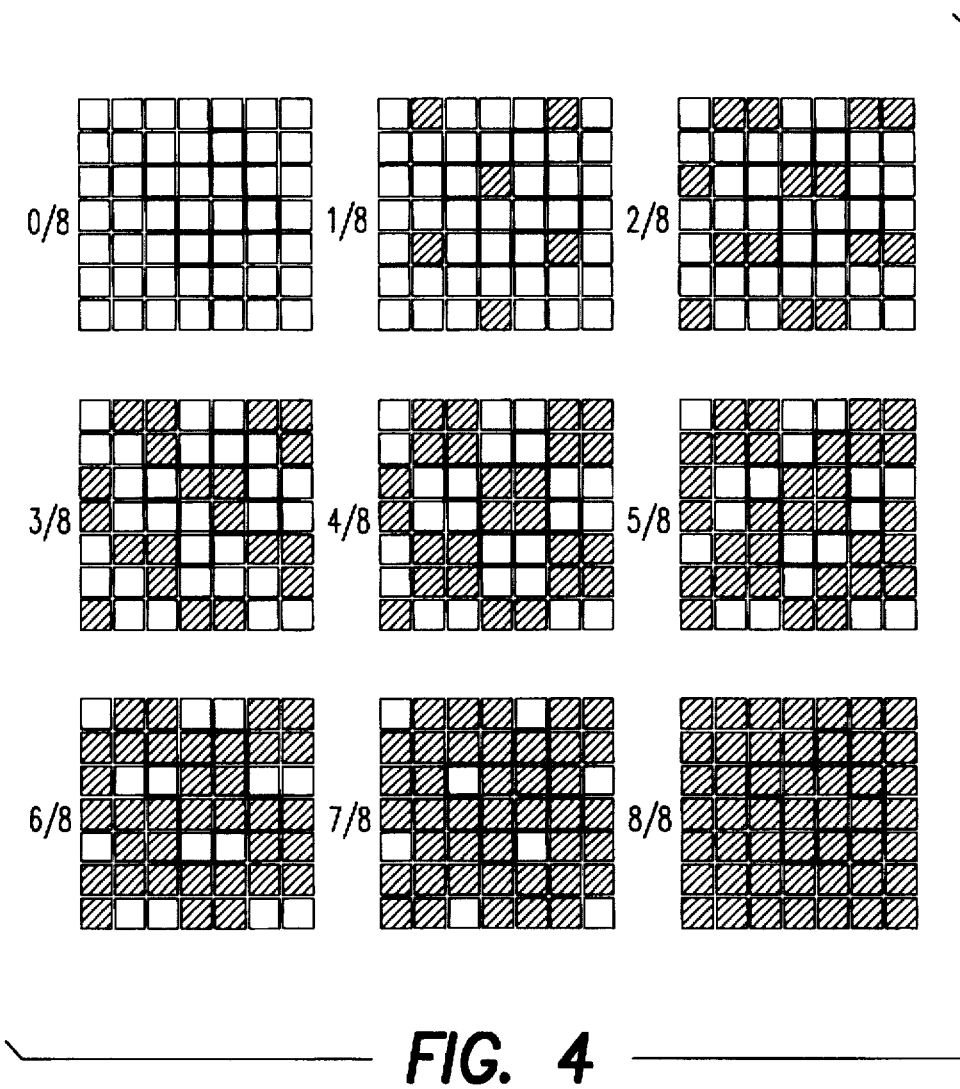
FIG. 4 is an illustration of halftone processing for a bilevel device, using the halftone screen of FIG. 3A.

The non-linearity which is depicted in FIG. 2 is that which occurs over the area of a halftone cell. To illustrate this concept, a halftone procedure based on the halftone screening approach will be described. Basically, in this approach, a pixel cell is defined which covers some area in the pixel space of the output device, e.g. a portion of a page in a printer. The pixel cell need not have a square or rectangular shape. For example, FIG. 3A illustrates a known non-square array of pixels that is employed as a halftone cell in laser printers. This particular array comprises eight pixels, which are respectively numbered in order of priority. Multiple pixel arrays of this type can be arranged to cover the entire display area, as shown in FIG. 3B. A halftoning pixel array which contains eight pixels, as in the example of FIGS. 3A and 3B, can be employed to represent nine grayscale levels, i.e. white, black and seven intermediate levels, in a bilevel printer. The manner in which this result is accomplished is shown in FIG. 4, for each of the nine possibilities. As can be seen, for the color white (case 0/8), none of the pixels in a cell contains black ink or toner, whereas for the color black (case 8/8) all of the pixels in each cell are filled with the color black. For each of the intermediate grayscale levels, a number of pixels in each cell is filled which corresponds to that level. Thus, for the first grayscale level, one pixel in each cell is filled, and for the middle level (case 4/8) four pixels are filled.

The progression of the intensity of the image from white to black in this example is non-linear, even though the number of pixels which are filled from one step to the next increments in a linear fashion. This is due, at least in part, to the fact that the actual dot of ink or toner that is deposited on the paper is not a square whose boundary coincides with that of the pixel. Rather, it is typically circular in shape, and has an area greater than that of the square pixel. Consequently, adjacent dots tend to overlap one another, causing the color intensity to rise more rapidly as more dots of ink are deposited in a cell.

Figure 5:
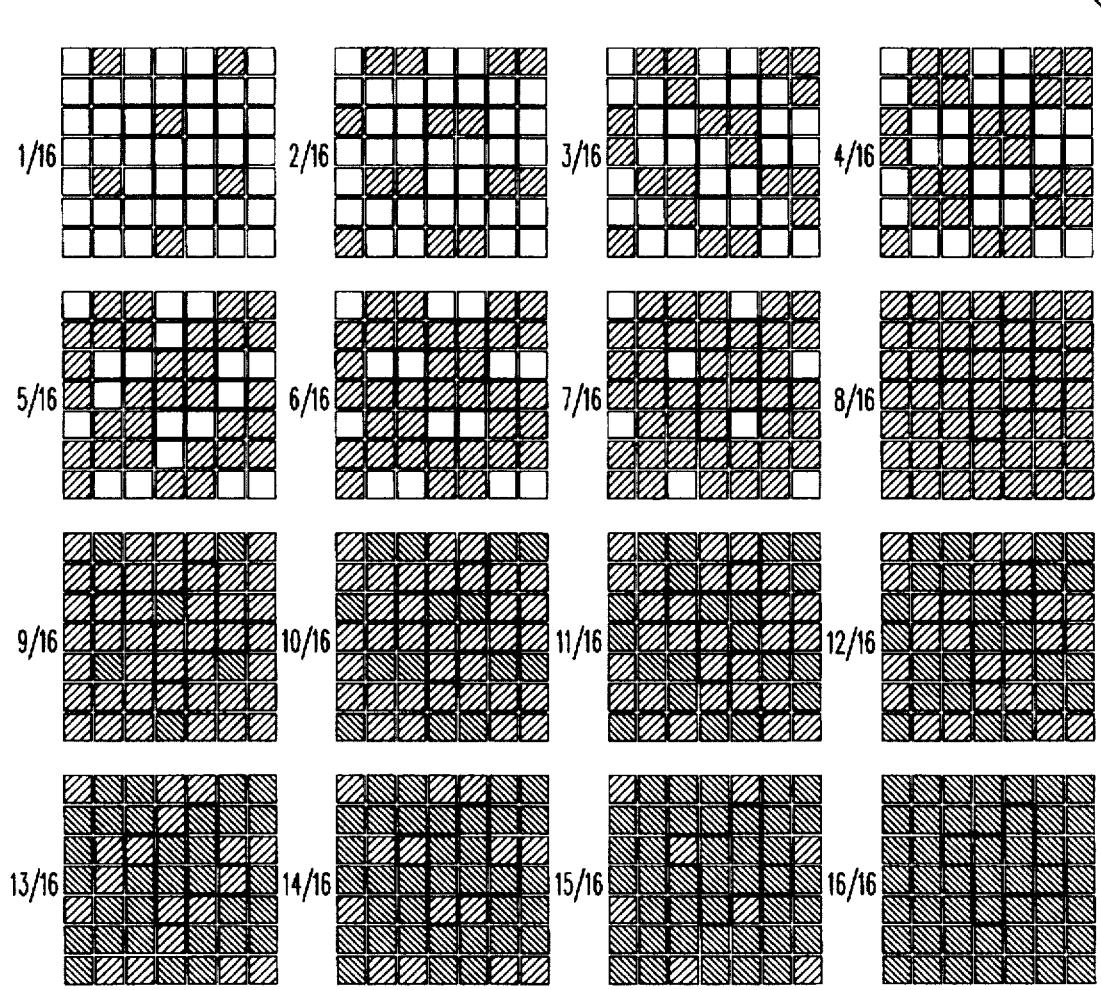
FIG. 5 is an illustration of halftone processing for a multi-level device.

In a multi-level output device, individual pixels can take on more than the two boundary values of black and white. FIG. 5 illustrates an example of halftoning in a multi-level device in which each pixel can have one of three values, namely white, black or an intermediate gray level. In this case, using the same halftone cell, seventeen different grayscale levels can be achieved. The sixteen non-white levels for this example are illustrated in FIG. 5.

Figure 6:
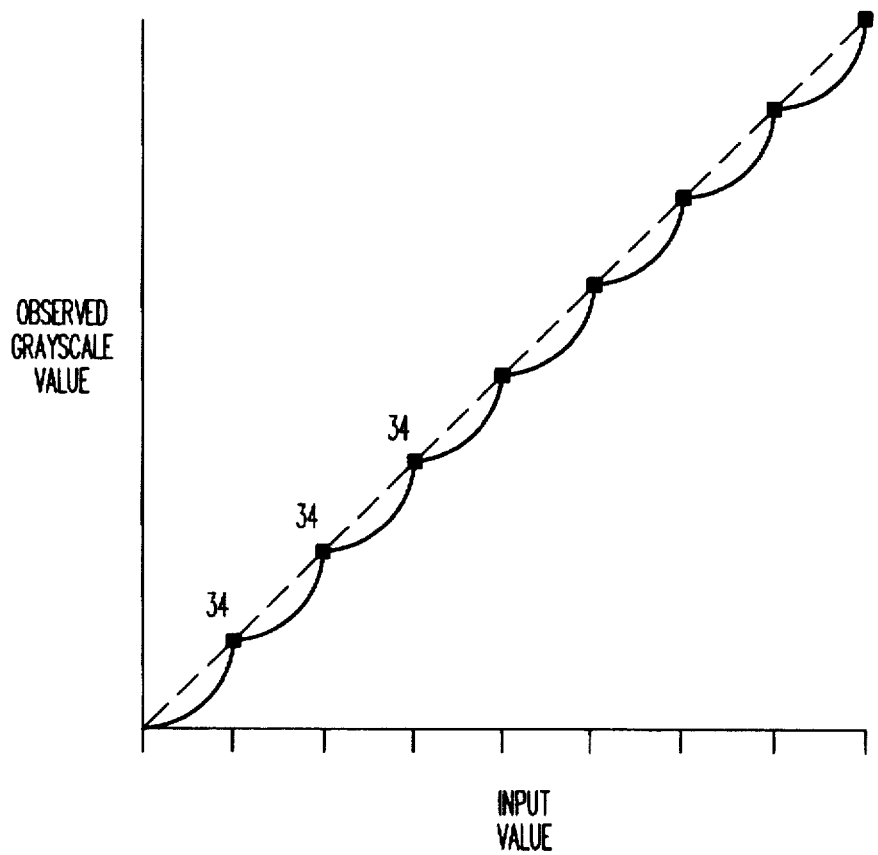
FIG. 6 is a graph illustrating the non-linearity associated with multi-level image reproducing devices.

When individual pixels can be represented with multiple levels of intensity, an additional type of non-linearity is introduced in the output image. In addition to the non-linearity of the overall cell pattern as depicted in FIG. 2, the intensity of each individual pixel can also be non-linear, as depicted in the graph of FIG. 6. In essence, the conventional tonal reproduction corrector 22 functions to correct the output of the halftone processor 24 for individual data points 34, to produce a linear result at a gross level. In the preceding example of FIG. 4, these data points correspond to the nine grayscale values that can be achieved with the halftoning process. However, in a printer which can produce multiple levels of pixel intensity, an additional level of non-linearity can be introduced between the individual data points 34, which is not corrected by the TRC 22. This additional level of non-linearity is an inherent characteristic of the printing mechanism, and results in a "ripple" effect in the printed grayscale gradient, as shown in FIG. 6.

Figure 7:
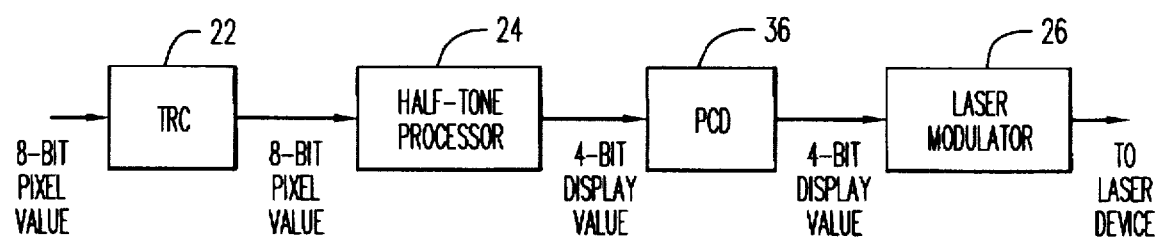
FIG. 7 is a general block diagram of a first embodiment of the present invention.

In accordance with the present invention, the output values from the halftone processor 24 undergo additional correction at the pixel level to compensate for this second level of non-linearity. FIG. 7 illustrates an embodiment of the invention for a printer which is capable of producing sixteen levels of gray for each pixel. The image data is expressed in 8-bit pixel values, which are capable of uniquely representing 256 gray levels. An 8-bit pixel value from the frame buffer 20 is presented to a TRC processor 22, which operates in a conventional manner, to produce an 8-bit compensated output value. This value is processed in the halftone processor 24. Since the printer is capable of producing 16 levels of gray for each pixel, the output signal from the halftone processor 24 is a 4-bit display value. This value is applied to a pixel-level correction device 36, which linearizes the output values from the halftone processor 24 before they are applied to the laser modulator 26. By compensating the output values from the halftone processor in this manner to correct for the second level of non-linearity, a much smoother grayscale gradient can be observed in the printed image. The post-halftone correction device is also preferably implemented in the form of a look-up table that is stored in a memory associated with the halftone processor, or a separate memory accessible by a processor which implements the post-halftone correction. In the illustrated example, the input values to the post-halftone correction device are 4-bit numbers, and the output values are also 4-bit numbers. It is not necessary, however, that the number of input levels be identical to the number of output levels. In fact, it may be preferable to have the number of output levels be greater than the number of input levels, to provide better resolution in the signal to the print engine.

In many laser printers, the function of the laser modulator 26 is implemented in a look-up table. Basically, the display values generated by the halftone processor 24, or the post-halftone correction 36 in the case of the present invention, function as indices to a look-up table. The output values which are retrieved from the table, in response thereto, specify the necessary power control for the laser device, such as a laser diode, as its beam is scanned across a photosensitive surface.

Figure 8:
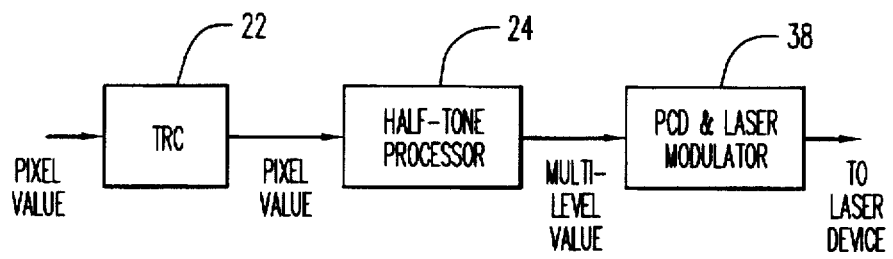
FIG. 8 is a block diagram of a second embodiment of the invention.

In a preferred embodiment of the invention, illustrated in FIG. 8, the look-up table for the post-halftone correction is integrated with that of the laser modulator, to form a single look-up table 38. For example, the correction factors that are implemented by the post-halftone correction can be concatenated with the power control factor stored in the modulator look-up table. The resulting values can be stored in a single, integrated look-up table 38. With this approach, the memory requirements of the printer are reduced, since only a single look-up table is required to perform two functions. Furthermore, processing speed is increased, since only one memory access, rather than two, is required.

The non-linearity of a pixel's intensity that results from the multiple available grayscale levels may not be a function of the individual pixel alone. Rather, the intensity of a given pixel may be dependent upon the display values of the pixels which surround it. For example, if a pixel having a given display value is totally surrounded by white pixels, it may have one intensity, whereas if all of the surrounding pixels also have the same display value, the pixel of interest may have a different intensity. In such a case, it may be desirable to apply different corrective factors to account for changes in the non-linearity of a given pixel's intensity that are dependent upon those of the surrounding pixels.

Figure 9:
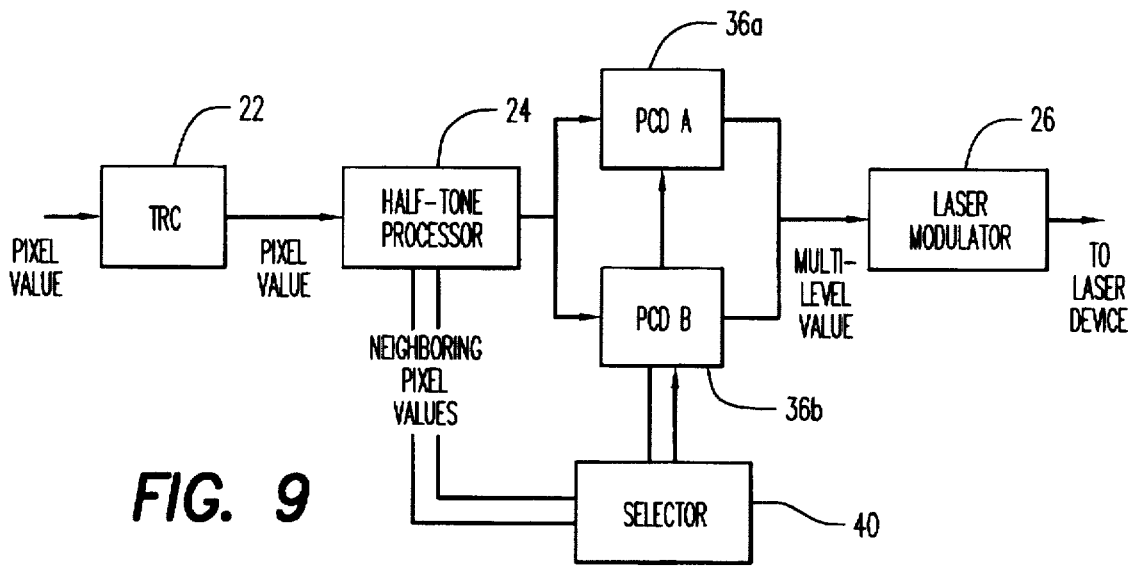
FIG. 9 is a block diagram of a third embodiment of the invention.

FIG. 9 illustrates an embodiment of the invention that is directed to this particular situation. Referring thereto, this embodiment includes a plurality of post-halftone correction devices 36a and 36b. For purposes of illustration, only two such devices are shown. One device may provide correction of a non-linearity having a concave-shaped function, of the type shown in FIG. 6, whereas another may provide correction of an S-shaped non-linearity of the type shown in FIG. 2. Any integral number of post-halftone correction devices can be employed. The actual number which is employed will be dependent upon the different types of non-linearity in pixel intensities that are to be corrected.

Also included in the embodiment of FIG. 9 is a selector 40 for selecting the particular post-halftone correction device, 36a or 36b, to be used for any given pixel. The selection is made on the basis of the display values of pixels which are neighbors of the particular pixel being processed. In the illustrated embodiment, two pixel values are provided to the selector. For example, these pixel values may be those for the two pixels which immediately precede and immediately follow the pixel of interest in the scanning direction of the laser beam. It will be appreciated that any number of neighboring pixels can be inspected to determine the particular post-halftone correction device to be employed for a given pixel. For example, it may be desirable to inspect all eight of the pixels which are immediately adjacent a pixel of interest. In a more general case, pixels that are located even farther from a pixel being processed can be inspected in the selector, if their values have an effect upon the intensity of the pixel being processed.

The number of post-halftoning correction devices to be employed, as well as the correction factors provided by each and the number of neighboring pixels to be evaluated for selection purposes, will be dependent upon the particular characteristics of the printer. These factors are empirically determined through analysis of the printer output.

In the illustrated embodiment, the display values for neighboring pixels are supplied to the selector 40 from the halftone processor 24. In practice, this data can be provided from any suitable source, such as the pre-halftone TRC device, for example.

Figure 10:
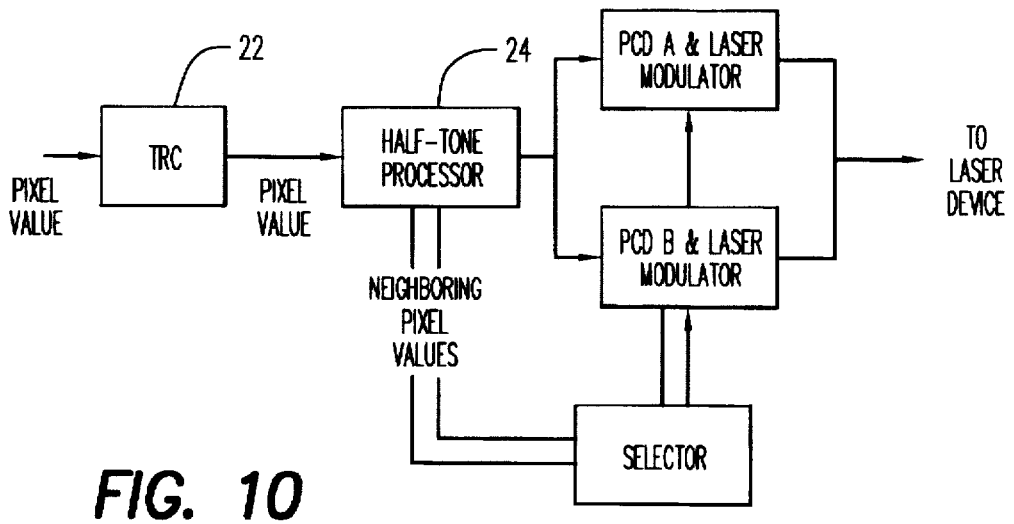
FIG. 10 is a block diagram of a fourth embodiment of the invention.

In a further implementation of the invention, illustrated in FIG. 10, the features of the embodiments of FIGS. 8 and 9 can be combined. Specifically, if the laser modulator 26 is implemented by means of a look-up table, this look-up table can be integrated with those of each of the post-halftone correction devices, and thereby eliminate the need for a separate look-up table for the modulator itself. As a result, this embodiment provides a more economical implementation of the invention when plural post-halftone correction devices are employed.

From the foregoing, it can be seen that the present invention provides an improved halftoning process for image reproducing devices that are capable of generating multiple levels of intensity per pixel. Through the use of a post-halftoning tonal reproduction corrector, non-linearities in the intensity of a pixel resulting from the multi-level image generation process are corrected, to thereby provide a smoother grayscale gradient over the available range of display values.

It will be appreciated by those of ordinary skill in the art that the present invention can be embodied in other specific forms without departing from the spirit or essential characteristics thereof. The presently disclosed embodiments are considered in all respects to be illustrative, and not restrictive. For example, although disclosed in the context of its application to a laser printer, the principles of the invention are equally applicable to other types of multi-level image reproducing devices, such as inkjet printers and liquid crystal displays. Furthermore, the invention is not limited to monochromatic image reproducing devices. Rather, the principles of the invention are applicable to color imaging devices which employ a plurality of color components to generate an image. The scope of the invention is indicated by the appended claims, rather than the foregoing description, and all changes that come within the meaning and range of equivalence thereof are intended to be embraced therein.

What is claimed is:

1. An image reproducing device, comprising:

means for producing image values for individual picture elements of an image;

an image generating device for producing a visible image, wherein each picture element of the visible image has a display value that can be at one of multiple intensity levels;

a halftone processor for converting said image values into display values at said multiple intensity levels;

a first correcting device for correcting said image values to compensate for non-linearities in the display values caused by said halftone processor; and a second correcting device for correcting individual display values to compensate for non-linearities of said display values over a range of said multiple intensity levels.

2. The image reproducing device of claim 1 wherein at least one of said correcting devices includes a look-up table.

3. The image reproducing device of claim 2 wherein both of said correcting devices include a look-up table.

4. The image reproducing device of claim 1 wherein said first correcting device corrects said image values prior to receipt of said image values by said halftone processor, and said second correcting device corrects said data values after conversion by said halftone processor and prior to receipt by said image generating device.

5. The image reproducing device of claim 1 wherein said second correcting device comprises at least two look-up tables, and means for selecting one of said look-up tables for correction of said display values.

6. The image reproducing device of claim 5 wherein said selecting means selects one of said look-up tables on the basis of display values for picture elements that are adjacent to a picture element being processed.

7. The image reproducing device of claim 1 wherein said second correcting device includes a look-up table and said image generating device includes a modulator that is implemented in the form of a look-up table.

8. The image reproducing device of claim 7 wherein the look-up table for said second correcting device and the look-up table for said modulator are integrated in a single look-up table.

9. The image reproducing device of claim 1 wherein said second correcting device comprises a plurality of selectable look-up tables and said image generating device comprises a modulator having an associated look-up table, and wherein the look-up table for said modulator is integrated in the look-up tables for said second correcting device.

10. In an image reproducing device of the type in which each picture element of an image can be reproduced at one of multiple levels, a method for generating a halftoned image, comprising the steps of:

generating image values for the picture elements of an image, wherein each image value represents one of N levels;

halftone processing said image values to produce corresponding display values, wherein each display value represents one of M levels and $N>M>2$;

correcting said image values to compensate for non-linearities in the display values caused by said halftone processing;

correcting individual display values to compensate for non-linearities in said display values over said M levels; and generating a visible image in accordance with the corrected display values.

11. The method of claim 10 wherein the step of correcting said image values is carried out prior to said halftone processing step.

12. The method of claim 11 wherein the step of correcting said display values is carried out after said halftone processing step.

13. In an image reproducing device of the type in which individual pixels are reproduced with an intensity value that can occupy one of multiple levels in a range of intensity values, a halftone processor comprising:

means for converting image data into display values commensurate with the number of levels in said range; and a correcting device for correcting said display values to compensate for non-linearities of said display values over said range of intensity values.

14. The image reproducing device of claim 13 wherein said correcting device comprises at least two look-up tables, and means for selecting one of said look-up tables for correction of said display values.

15. An image reproducing device, comprising:

means for producing image values for individual picture elements of an image;

an image generating device for producing a visible image, wherein each picture element of the visible image has a display value that can be at one of multiple intensity levels;

a halftone processor for converting said image values into display values at said multiple intensity levels;

a pre-halftone correcting device for correcting said image values to compensate for non-linearities in the display values caused by said halftone processor;

at least two post-halftone correcting devices for correcting said display values to compensate for non-linearities of said display values over a range of said multiple intensity levels; and means for selecting one of said post-halftone correcting devices on the basis of display values for picture elements that are adjacent to a picture element whose display value is being corrected.

16. The image reproducing device of claim 15 wherein each of said post-halftone correcting devices comprises a look-up table.

17. The image reproducing device of claim 15 wherein each of post-halftone correcting devices comprises a look-up table and said image generating device comprises a modulator having an associated look-up table, and wherein the look-up table for said modulator is integrated in the look-up tables for said post-halftone correcting devices.

18. The image reproducing device of claim 1 wherein said second correcting device applies a transfer function to individual display values, which is an inverse of said non-linearity over said range of multiple intensity levels.

19. The image reproducing device of claim 1 wherein said second correcting device includes a look-up table containing values which are related to the inverse of said non-linearities over said range of multiple intensity values.

20. The method of claim 10 wherein said step of correcting individual display values includes applying a transfer function to individual display values, which is an inverse of said non-linearity over said range of multiple intensity levels.

* * * * *